United States Patent [19]

Christopher et al.

[11] Patent Number: 4,638,360
[45] Date of Patent: Jan. 20, 1987

[54] TIMING CORRECTION FOR A PICTURE-IN-PICTURE TELEVISION SYSTEM

[75] Inventors: Todd J. Christopher; Donald H. Willis, both of Indianapolis; Russell T. Fling, Fishers, all of Ind.

[73] Assignee: RCA Corporation, Princeton, N.J.

[21] Appl. No.: 771,700

[22] Filed: Sep. 3, 1985

[51] Int. Cl.⁴ .................. H04N 5/04; H04N 5/262
[52] U.S. Cl. ............................. 358/148; 358/149; 358/183; 340/814
[58] Field of Search ............ 358/148, 149, 183, 903, 358/22, 158; 340/814, 748, 747, 750

[56] References Cited

U.S. PATENT DOCUMENTS

| | | | |
|---|---|---|---|
| 3,996,605 | 12/1976 | Coffey | 358/8 |
| 4,139,860 | 2/1979 | Micic et al. | 358/22 |
| 4,214,262 | 7/1980 | Mizukami | 358/19 |
| 4,249,213 | 2/1981 | Imaide et al. | 358/183 |
| 4,266,245 | 5/1981 | Balaban et al. | 358/158 |
| 4,291,332 | 9/1981 | Kato et al. | 358/19 |
| 4,339,770 | 7/1982 | Dennison et al. | 358/19 |

OTHER PUBLICATIONS

"Digit 2000 NTSC Double-Scan VLSI Digital TV System" Data Book, ITT Intermetal, ED. 1985/5, pp. 47-72.

Primary Examiner—Michael A. Masinick
Assistant Examiner—Michael D. Parker
Attorney, Agent, or Firm—E. M. Whitacre; P. J. Rasmussen; K. N. Nigon

[57] ABSTRACT

System performance of picture-in-picture video display systems is dependent on critical timing relationships between the incoming signals and the clock signals used to sample and display both the large picture and small picture signals. Video signals from various sources, e.g. VTR's, tend to have jittering time bases which may cause the small image to appear jagged or tilted. This distortion in the small image may be reduced by effecting adaptive signal delays in the small picture signal responsive to the relative phase of the system clock signal with respect to the horizontal synchronizing pulses of the large and/or small picture signal. One phase measure is used to control an interpolator which combines successive samples of the small picture signal in proportions to develop sample values corresponding to samples that would have occurred had the small picture signal been sampled by a clock properly aligned to the small picture horizontal synchronizing pulses. A second phase measure is used to delay the clock signal used to display the small picture so that the clock pulses that define the edges of the small picture occurs with the same timing relative to the large picture horizontal synchronizing pulses form line-to-line.

17 Claims, 6 Drawing Figures

TIMING CORRECTION FOR A PICTURE-IN-PICTURE TELEVISION SYSTEM

This invention relates to apparatus for reducing the visibility of timing errors in the inset image of a picture in picture (PIP) television display system.

In a PIP system, two images from possibly unrelated sources are displayed simultaneously as one image. The composite image includes a full size primary image and a reduced size secondary image displayed as an inset. The subjective quality of the inset portion of the composite image may be affected by timing errors in either the primary or secondary signals.

The timing errors relevant to the present invention occur when either the primary or secondary signal is a nonstandard signal. As used in this application, the term nonstandard signal means a video signal having a horizontal line period which may vary in width by, for example, 4 ns or more from the horizontal line period set by the signal standard to which the video signal nominally conforms (e.g. NTSC, PAL, or SECAM).

To understand how these timing errors may affect the inset image, it is helpful to know how the secondary signal is processed and displayed. In a conventional PIP display system, the secondary signal is sampled at instants determined by a sampling clock signal which, desirably, bears a fixed relationship to the horizontal line scanning frequency of the secondary signal. To aid separation of the luminance and chrominance components of color television signals, the sampling clock signal has a frequency that is a multiple of the chrominance subcarrier frequency which is itself a harmonic of one-half the horizontal line scanning frequency. This sampling clock signal may be developed by a phase locked loop which locks the clock signal to the color reference burst component of the composite video signals.

The secondary signals are separated into their component parts, generally a luminance signal and two color difference signals, and then subsampled both vertically and horizontally to develop signals which represent a reduced-size image. The lines of samples taken during one field of the secondary signal are stored in a memory. These samples are then read from the memory for display using a clock signal which is desirably related to the horizontal line scanning frequency of the primary signal.

When the secondary signal originates from a video tape recorder (VTR), video disk player or home computer, the frequency of the color burst signal may be relatively stable while the frequency of the horizontal line scanning signal may vary significantly from line to line. This variation may be caused by stretching of the tape, defects in the disk, motor speed variations in either the VTR or disk player, or inaccuracies in the frequencies used by the home computer. Since the sampling clock signal is locked to the burst signal, corresponding sampling points on successive lines may be shifted or skewed relative to each other. When these lines of samples are displayed in synchronism with the primary signal, the corresponding samples do not line up vertically. Consequently vertical lines in the inset image may appear jagged, if the timing errors randomly change the period of the horizontal sync signal, or tilted if there is a fixed error in the horizontal sync period. Assuming a 3:1 reduction in the secondary image, a timing difference of 12 ns or more in successive horizontal line periods of the secondary signal may produce noticeable skew distortion in the inset image.

Timing errors in the primary signals change the relative time difference between primary horizontal sync pulses, which define the edges of the primary image, and the first samples in lines of the inset image. Primary signal timing errors that cause the periods of successive horizontal sync pulses to vary from the applicable signal standard by 4 ns or more may produce noticeable skew distortion in the inset image. This distortion causes the entire inset image to appear jagged or tilted.

To gain a better understanding of skew and the methods which may be used to compensate for it, consider the waveforms shown in FIG. 1. The waveform A represents a portion of one horizontal line of, e.g. luminance signal, including the horizontal synchronizing pulse (note the waveforms of FIG. 1 are not drawn to scale). Waveforms B, C and C' represent sampling (system) clock waveforms. The pulses of waveform B are assumed to occur at the points in time that a subcarrier locked clock, locked to a standard signal, would occur. Put another way, if waveform A corresponds to n lines of an image, then waveform B represents the desired sampling (system) clock for each successive line, i.e. without skew. A clock signal having constant skew may also be desirable. In either a zero skew or a constant skew system, the sampling clock pulse r always occurs at the same point in time relative to the HSYNC pulse. This point in time is represented by the sample S2 on waveform A. Waveform C represents a subcarrier locked clock which exhibits a degree of skew. The number of pulses per line period contained in waveform C may not be constant from line-to-line. Generally, the difference in the number of whole clock pulses in a line period can be compensated for in the phase locked loop which generates the horizontal synchronizing signal. The sampling phase error (skew) which is a fractional portion of a clock period, however, may only be corrected by operation on the samples themselves or on the sampling clock signal.

One method of correction is to adjust the sample values on a line-by-line basis so that the adjusted samples conform to samples that would be taken by a clock with zero skew or with some constant skew. For example, the sample values generated by the clock signal of waveform C may be adjusted to equal or approximate corresponding sample values that would be generated by the clock signal of waveform B. In the FIG. 1, clock pulse r' of waveform C is assumed to correspond to clock pulse r of waveform B. Clock pulse r' is advanced in time or skewed by one-half of one clock period, TS, with respect to clock pulse r. Clock pulse r' generates a sample value S1. Desirably, clock pulse r' should occur coincident with clock pulse r and generate the sample value S2.

Replacing the sample taken coincident with clock pulse r' with a sample having a value approximately equal to S2 effectively advances the timing of the signal taken with the sampling clock signal C so that it matches the signal which would have been taken had the zero-skew sampling clock signal B been used. Neglecting the complications of chrominance decoding, an alternative method of skew correction is to adjust the phase of the sampling clock signal on a line-by-line basis so that it approximately matches the phase of the desired clock signal B or some other clock signal which exhibits equal skew from line to line. The waveform C' represents the clock signal C delayed an amount of time substantially equal to the skew. Samples taken with this delayed clock signal approximate samples taken with the desired clock signal, B.

The first skew correction method may be used to correct skew errors in the secondary signal since it does not affect the phase of the sampling clock signal. It is recalled that the phase of this clock signal cannot be changed without affecting the processing of the secondary chrominance signal components. The second skew correction method may be used to compensate for skew errors in the primary signal when the samples representing the separated luminance and color difference signal components of the secondary image are retrieved from the secondary field memory for display.

SUMMARY OF THE INVENTION

The present invention is embodied in apparatus which compensates for timing errors in a first video signal relative to a second, stored video signal. This apparatus includes circuitry for measuring the time interval between a horizontal synchronizing pulse of the first signal and a pulse of the clock signal which controls the retrieval and display of the second signal. The apparatus further includes circuitry with changes the timing of the second signal relative to the horizontal sync component of the first signal, as the second signal is displayed, to compensate for any variations in the measured time intervals from line-to-line.

DETAILED DESCRIPTION OF THE INVENTION

Figure 1:
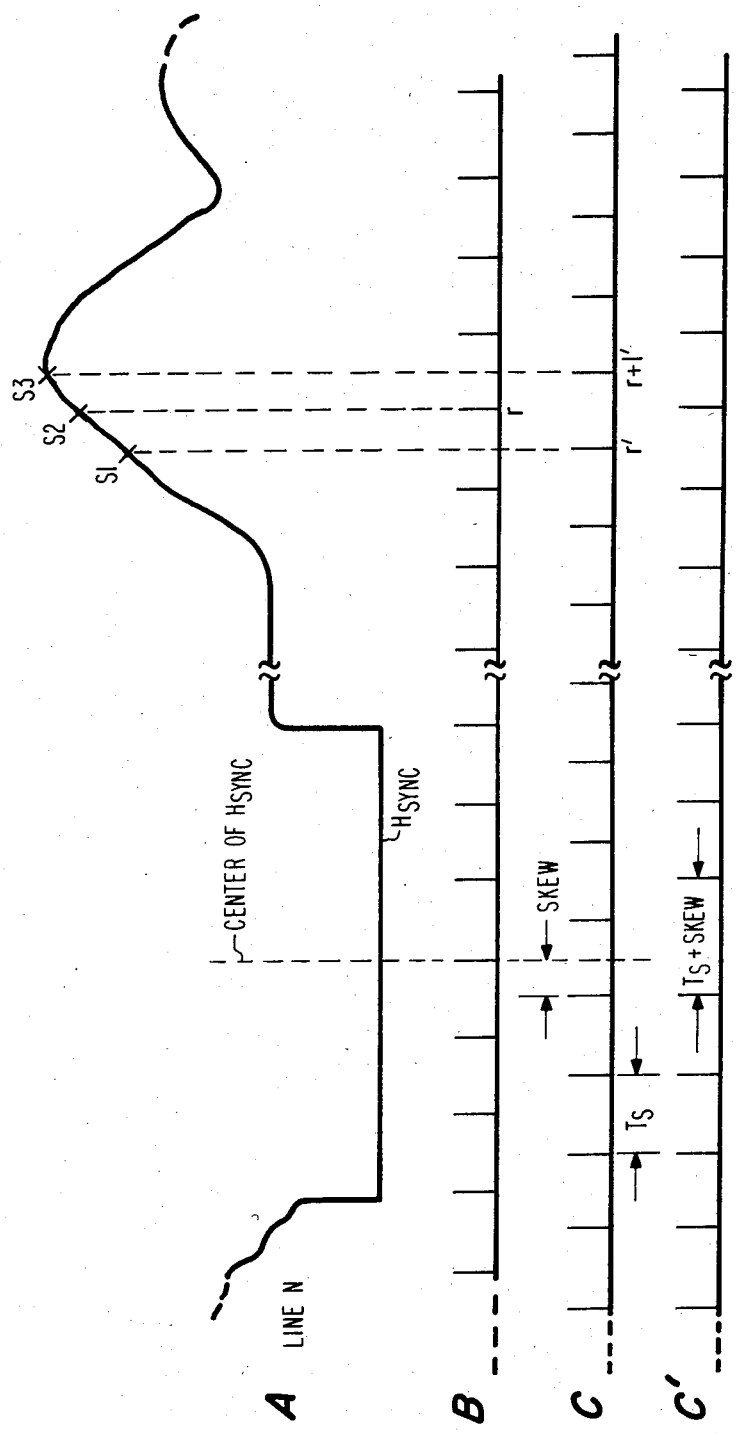
FIG. 1 is a timing diagram useful in describing skew and methods of skew correction.

In the drawings, broad arrows represent busses for multiple-bit parallel digital signals and line arrows represent connections carrying analog signals or single bit digital signals. Depending on the processing speed of the devices, compensating delays may be required in certain of the signal paths. One skilled in the art of digital signal processing circuit design would know where such delays would be needed in a particular system.

Figure 2:
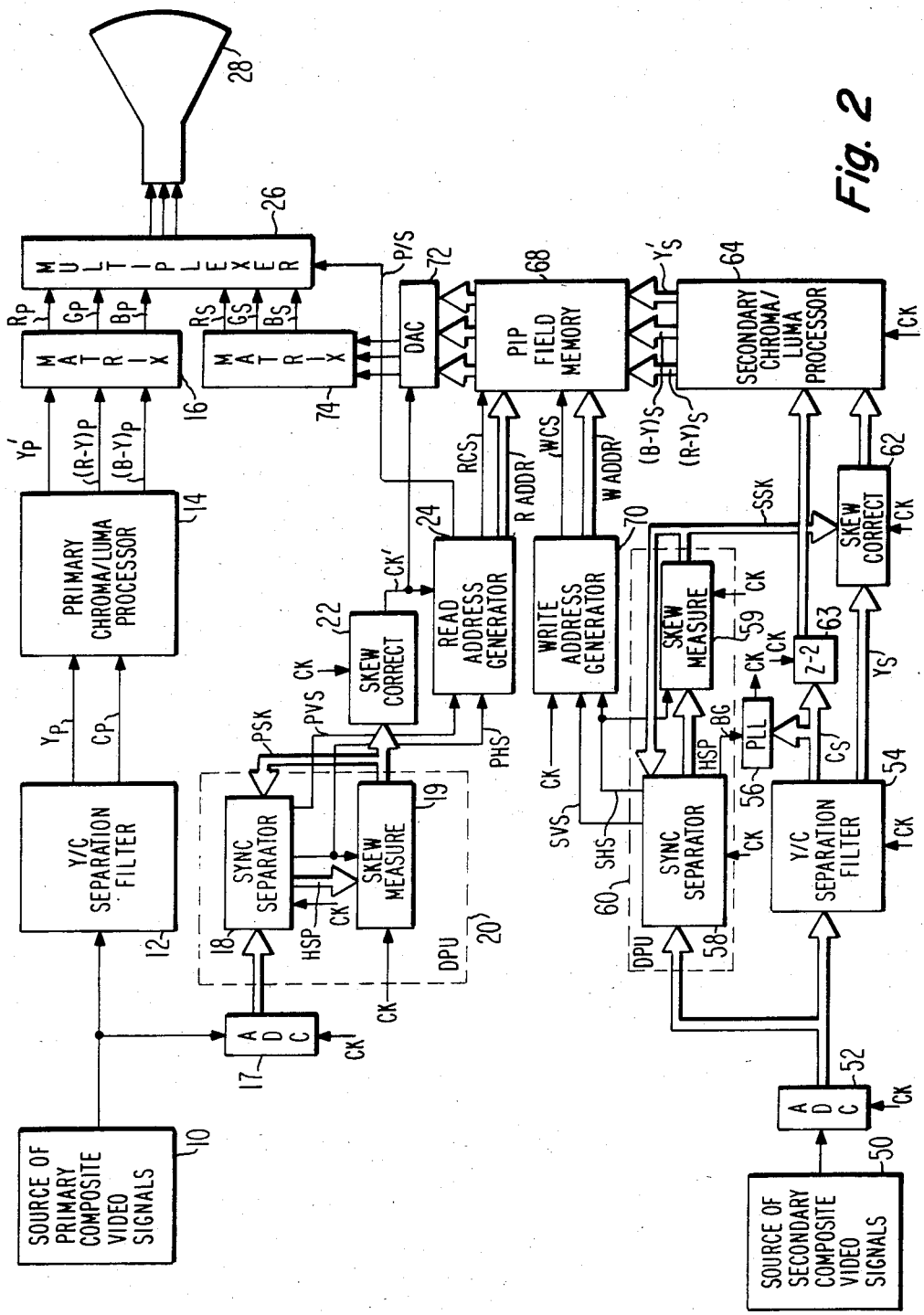
FIG. 2 is a block diagram of a PIP television display system incorporating the present invention.

FIG. 2 is a block diagram of a PIP display device in which the primary signal is processed using conventional analog apparatus and the secondary signal is processed digitally. This circuitry uses a single clock signal, synchronized to the secondary burst signal, both for sampling and processing the secondary signal and for displaying the secondary image as an inset in the main image.

A source of primary composite video signals 10 applies the primary video signals to a Y/C separation filter 12. Filter 12, which may include conventional low-pass and high-pass filters, separates the composite video signals into primary luminance signals, $Y_P$, and primary chrominance signals $C_p$. The primary luminance and chrominance signals are applied to a primary chroma/luma processor 14 which may include, for example, band shaping filters for peaking the high frequency components of the luminance signals to develop a signal $Y'_P$ and a chrominance signal demodulator for deriving the baseband color difference signals $(R-Y)_P$ and $(B-Y)_P$ from the primary chrominance signals, $C_P$. The signals $Y'_P$, $(R-Y)_P$, and $(B-Y)_P$ applied to a matrix 16 which combines the signals to develop the color signals $R_P$, $G_P$ and $B_P$. These signals are applied to one set of signal input terminals of an analog multiplexer 26, the output of which drives a cathode ray tube (CRT) 28. The color signals $R_S$, $G_S$ and $B_S$ developed from the secondary signal are applied to a second set of signal input terminals of the multiplexer 26. These signals are developed by apparatus described below.

A source of secondary composite video signals 50, which may include the tuner, IF amplifier and video detector of a conventional color television receiver, provides secondary composite video signals to an analog-to-digital converter (ADC) 52. ADC 52 samples and digitizes the secondary composite video signals at instants determined by the sampling clock signal CK. A phase-locked-loop (PLL) 56, described below, generates the signal, CK, which has a frequency $4f_c$ substantially equal to four times the chrominance subcarrier frequency, $f_c$. The signal CK is phase locked to the color synchronizing burst component of the secondary video signals.

ADC 52 provides digitized secondary video signals to a Y/C separation filter 54. Filter 54 may be a conventional digital filter having a clock input terminal coupled to receive the signal CK. Filter 54 may include, for example, an FIR filter which passes the chrominance signal components of composite video signal to the relative exclusion of luminance signal components and a subtracter for subtracting the chrominance signal components from the composite signal to develop luminance signal components.

ADC 52 also provides secondary composite video signals to a deflection processing unit (DPU) 60, which includes sync separator circuitry 58 and skew error measuring circuitry 59. The sync separator circuitry 58 and skew measuring circuitry 59 in the illustrated embodiment are components in a phase-locked-loop which produces a horizontal synchronizing signal, SHS, that is phase-locked to the horizontal synchronizing signal component of the secondary signal. Sync separator circuitry 58 applies the signal SHS and a digital value (HSP) containing an integer part and a fractional part representing the period of the signal SHS in units of one-sixteenth of the sampling clock period (1/16 Ts) to the skew measuring circuitry 59. The sync separator circuitry 58 also develops the vertical synchronization signals, SVS, and a burst gate signal, BG, from the digitized secondary composite video signals. The burst gate signal, BG, and the separated chrominance signals from filter 54 are applied to PLL 56. PLL 56 is, for example, a circuit similar to that described in U.S. Pat. No. 4,291,332 entitled "Phase Locked Circuit" which is hereby incorporated by reference.

The clock signal CK is applied to the skew measuring circuitry 59. Exemplary skew measuring circuitry 59 accumulates the fractional part of the horizontal skew period values, HSP, provided by the sync separator circuitry 58 to develop a secondary skew signal, SSK. The integer part of the signal SSK is fed back to the sync separator circuitry 58, where it is used in the phase-locked-loop to update the horizontal sync period measurement. The fractional part of the signal SSK is retained in the accumulator of the skew measuring circuitry 59 and applied as skew values to the skew correcting circuitry 62. As used in the present embodiment, the fractional part of the signal SSK represents the time interval between the center of the respective phase locked horizontal sync pulse and the leading edge of the clock pulse which occurs immediately before the center of the respective horizontal sync pulse. This interval is measured with a resolution substantially equal to one-sixteenth of the period of the signal CK. The sync separator circuitry 58 and the skew measuring circuitry 59 are of the type contained in the integrated circuit DPU 2532 manufactured by ITT Intermetall GmbH and which is described at pages 47–72 of the data book "Digit 2000 NTSC Double-scan VLSI Digital TV System" edition 1985/5 of ITT Intermetall, Freiburg, W. Germany.

Figure 4:
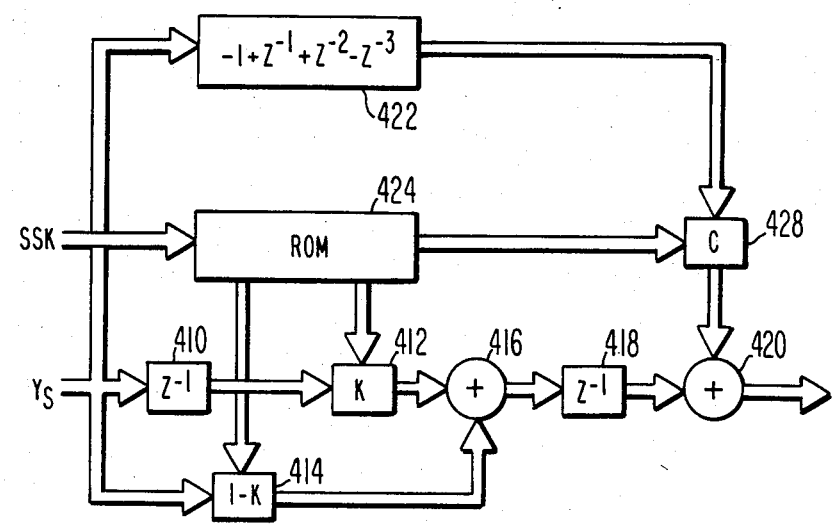
FIGS. 4 and 5 are a block diagrams showing skew correction circuitry which may be used in the display devices shown in FIGS. 2 and 3.

Exemplary skew error correcting circuitry 62 is shown in FIG. 4. This circuitry interpolates between successive input samples to provide output samples that are substantially equivalent to the samples which would have been taken synchronous with a sampling clock signal having zero skew. The circuitry shown in FIG. 4 may be divided into two parts, a linear interpolator and a correction circuit. Luminance samples $Y_S$ are applied to a delay element 410, which delays the samples by one period of the clock signal CK. The delayed samples are applied to a multiplier 412 which scales the samples by a factor K. The factor K may be a value between zero and one and is provided by a read only memory (ROM) 424 in response to the secondary skew signal SSK. Luminance samples $Y_S$ are also applied to a multiplier 414 which scales these undelayed samples by a factor $1-K$, also provided by ROM 424. The samples provided by the multipliers 412 and 414 are summed in adder 416.

The samples provided by adder 416 are linearly interpolated samples. If the frequency components of the sampled signals $Y_S$ are an order of magnitude or more lower than the sampling frequency, the apparent delay of the interpolated samples is given by the product $KT_S$, where $T_S$ is the period of the sampling clock signal CK. As the frequency components of the sampled signals approach the sampling frequency, however, the amount by which Ys appears to have been delayed becomes a function of the levels of its higher frequency components as well as of K. The correction circuit, which includes filter 422, multiplier 428 and adder 420 compensates for the frequency induced delay components. Luminance signals $Y_S$ are applied to the filter 422 which has the transfer function $T_{422} = -1 + Z^{-1} + Z^{-2} - Z^{-3}$ expressed in Z transform notation. The samples provided by filter 422 are scaled by a factor C in multiplier 428. The factor C is provided by ROM 424 in response to the secondary skew signal, SSK. The samples developed by adder 416 are applied to a delay element 418 which compensates for the processing time through filter 422. These delayed samples are then added to the samples from multiplier 428 by an adder 420.

The combination of the linear interpolator and the correcting filter produce signals having an apparent delay of $(1+K)T_S$ where the signals to be delayed have components with frequencies as high as one-third of the frequency of the sampling clock signal. In the NTSC system, for example, where the sampling clock frequency is approximately 14.3 MHz this skew correcting circuit provides uniformly spaced delays for luminance signals which may have frequency components up to 4.2 MHz. I defines the contents of ROM 424 to achieve delay steps of one-sixteenth of a sampling clock period.

TABLE I

| SSK | K | 1-K | C | DELAY CHANGE | TOTAL DELAY |
|---|---|---|---|---|---|
| 15 | 1/16 | 15/16 | 1/32 | $T_S/16$ | $17T_S/16$ |
| 14 | 2/16 | 14/16 | 1/32 | $2T_S/16$ | $18T_S/16$ |
| 13 | 3/16 | 13/16 | 2/32 | $3T_S/16$ | $19T_S/16$ |
| 12 | 4/16 | 12/16 | 2/32 | $4T_S/16$ | $20T_S/16$ |
| 11 | 5/16 | 11/16 | 2/32 | $5T_S/16$ | $21T_S/16$ |
| 10 | 6/16 | 10/16 | 3/32 | $6T_S/16$ | $22T_S/16$ |
| 9 | 7/16 | 9/16 | 3/32 | $7T_S/16$ | $23T_S/16$ |
| 8 | 8/16 | 8/16 | 3/32 | $8T_S/16$ | $24T_S/16$ |
| 7 | 9/16 | 7/16 | 3/32 | $9T_S/16$ | $25T_S/16$ |
| 6 | 10/16 | 6/16 | 3/32 | $10T_S/16$ | $26T_S/16$ |
| 5 | 11/16 | 5/16 | 3/32 | $11T_S/16$ | $27T_S/16$ |
| 4 | 12/16 | 4/16 | 2/32 | $12T_S/16$ | $28T_S/16$ |
| 3 | 13/16 | 3/16 | 2/32 | $13T_S/16$ | $29T_S/16$ |
| 2 | 14/16 | 2/16 | 1/32 | $14T_S/16$ | $30T_S/16$ |
| 1 | 15/16 | 1/16 | 1/32 | $15T_S/16$ | $31T_S/16$ |
| 0 | 1 | 0 | 0 | $T_S$ | $2T_S$ |

The samples provided by this skew correcting circuit 62 have apparent delays of between $17T_S/16$ and $2T_S$. The delay is only apparent because the actual timing of the samples has not been changed. The skew correcting circuit 62 adjusts the sample values in each line of secondary luminance signals so they appear to have been generated using a sampling clock signal which had negligible skew.

The chrominance samples provided by Y/C separation filter 54 are applied to delay element 63 which provides a two sample period delay to compensate for the delay through the skew correcting circuitry 62. Because the chrominance signal has a smaller bandwidth than the luminance signal and because the eye is less sensitive to color transitions than to changes in brightness, skew errors in the chrominance signal are not as noticeable as skew errors in the luminance signal. Accordingly, the apparatus shown in FIG. 1 does not correct skew errors in the chrominance signal. It will be appreciated, however, that delay element 63 may be replaced with a skew correcting circuit similar to circuit element 62.

The luminance samples from skew correcting circuitry 62 and the chrominance samples from delay element 63 are applied to a secondary chroma/luma processor 64. Processor 64 may include, for example, an FIR band shaping filter for peaking the frequency spectrum of the digital luminance signals to provide a modified secondary luminance signal $Y_S'$ and a digital chrominance demodulator for developing samples which represent the baseband secondary color difference signals $(R-Y)_S$ and $(B-Y)_S$.

The signals $Y_S'$, $(R-Y)_S$ and $(B-Y)_S$ are applied to PIP field memory 68 where they are subsampled and stored under control of the write address generator circuitry 70. Memory 68 may be a conventional random access memory having a sufficient number of storage cells to hold one field of the subsampled secondary signal. This memory may be organized as three separate field memories, one for the luminance signal and one for each of the two color difference signals, or it may be organized as a single field memory with the sampled luminance and color difference signals combined into a single sampled signal. For example, these signals may be combined by alternately concatenating samples of the two color difference signals to samples of the luminance signal.

Data from the secondary chroma/luma processor 64 is written into the field memory 68 under control of the memory address generator circuity 70. The circuitry 70 develops write address signals, WADDR, and other control signals WCS, as may be needed from the clock signal CK, and the secondary vertical and horizontal sync signals SVS and SHS respectively. The write address generator circuitry 70 operates to subsample the secondary signal in, for example, a three-to-one ratio both vertically and horizontally by providing address values and control signals for the memory 68 at appropriate times.

Samples representing lines of the subsampled secondary image are read from the PIP field memory 68 under control of the read address generator circuitry 24. The signals applied to circuitry 24 are the primary vertical and horizontal sync signals, PVS and PHS respectively, and a skew corrected clock signal CK'. The circuitry 24 may for example, count pulses of the horizontal sync signal, PHS, relative to the vertical sync pulses, PVS, and pulses of the signal CK' relative to the primary horizontal sync pulses to determine when to initiate read operations for the memory 68 and when to switch the multiplexer 26 between providing primary and secondary drive signals to the display device 28. Read address generator 24 provides a read address signal, RADDR, and read control signals RCS, to the field memory 68 and a primary/secondary image selection signal, P/S to the multiplexer 26.

The write address generator circuitry 70, read address generator circuitry 24 and field memory 68 are not a part of the present invention and, so, are not described in detail. Exemplary circuitry for subsampling, storing, and retrieving the signal which produces the insert image is described in the U.S. Pat. Nos. 4,249,213 entitled "Picture-in-Picture Televsion Receiver" and 4,139,860 entitled "Television Receiver Equipped for Simultaneously Showing Several Programs" which are hereby incorporated by reference.

The Read address generator 24, it is recalled, operates in synchronism with the skew corrected clock signal CK'. This signal is generated as follows. Primary composite video signals from source 10 are applied to an ADC 17 which is clocked by the signal CK provided by the PLL 56. ADC 17 applies the sampled primary composite video signals to a DPU 20. DPU 20, which includes sync separator 18 and skew measuring circuitry 19 may be identical to the DPU 60 described above. The sync separator 18 develops the primary vertical sync signal, PVS, and the primary horizontal sync signal, PHS, from the primary composite video signals. The signal PHS, the horizontal sync period value HSP, and the clock signal CK are applied to the skew measuring circuitry 19. Circuitry 19 is functionally identical to the skew measuring circuitry 59 described above. It measures the time difference between the center of each pulse of the signal PHS and the leading edge of the immediately preceding pulse of the clock signal CK. The fractional part of the signal, PSK, provided by the skew measuring circuitry 19 is a four bit value indicating the skew for each primary horizontal scan line in units of one-sixteenth of the period of the clock signal CK. The integer part of the signal PSK is applied to the sync separator 18 as set forth above in reference to DPU 60. The fractional part of the signal PSK and the signal CK are applied to the skew correcting circuitry 22. Circuitry 22 may be a programmable delay element similar to that shown in FIG. 5.

Figure 5:
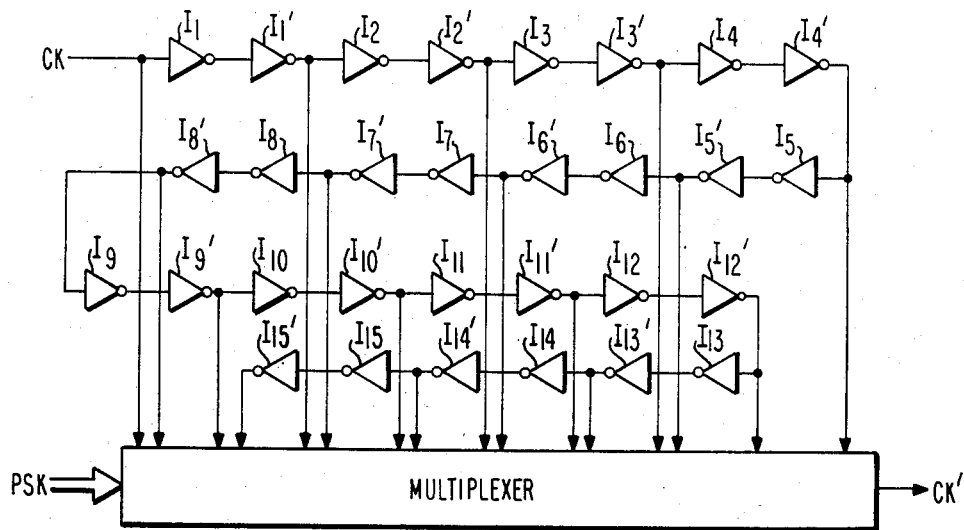

In FIG. 5, the clock signal CK is applied to the input termnal of an inverter $I_1$ which is the first inverter in a chain of thirty series-connected inverters. The inverter chain is organized as fifteen pairs of inverters, $I_1$ and $I_1'$ through $I_{15}$ and $I_{15}'$. The input terminal to the inverter $I_1$ and the output terminals of all of the pairs, i.e. $I_1'$, $I_2'$ . . . $I_{15}'$ are connected to respectively different data input terminals of the multiplexer 500. The control input port of multiplexer 500 is coupled to receive the fractional part of the primary skew signal, PSK, provided by the skew measuring circuitry 19. Each pair of inverters in the chain has a signal propogation delay of approximately one-sixteenth of the period of clock signal CK so the output terminals of each of the pairs provide clock signals delayed by between one-sixteenth and fifteen-sixteenths of a clock period. The multiplexer 500 is conditioned by the fractional part of the signal PSK to provide, as its output signal CK', the signal CK when PSK is zero, the signal at the output terminal of inverter of $I_1'$ when PSK is one, the signal at the output terminal of inverter $I_2'$ when PSK is two, and so on, providing the signal at the output terminal of inverter $I_{15}'$ when PSK is fifteen. Accordingly, the signal CK' provided by the skew correcting circuitry 22 is a clock signal CK delayed by an amount of time approximately equal to the value of the fractional part of PSK times one-sixteenth of the period of the signal CK. As set forth above, in reference to FIG. 1, this signal is a skew corrected clock signal, which is to say a clock signal aligned with the horizontal sync signal PHS from line-to-line.

The samples provided by the memory 68 in synchronism with the skew corrected clock signal CK' are applied to a digital-to-analog converter (DAC) 72 which is clocked by the skew corrected clock signal CK'. DAC 72 provides analog signals representing the secondary luminance and (R−Y) and (B−Y) color difference signals to the matrix 74. Matrix 74 is a conventional analog matrix which converts secondary luminance and color difference signals into the color signals $R_S$, $G_S$, and $B_S$ for application to the multiplexer 26 as set forth above.

The analog multiplexer 26 is controlled by the image selection signal P/S provided by the read address generator 24 to apply either primary or secondary signals to the display device 28 to develop composite PIP images.

Figure 6:
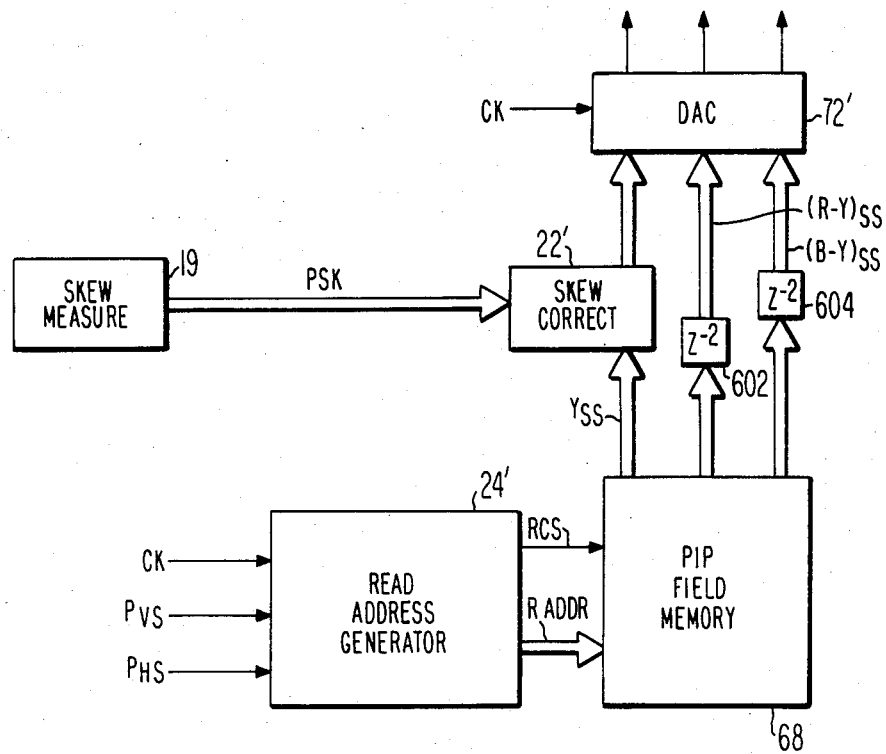
FIG. 6 is a block diagram of alternative skew correcting apparatus which may be used in the display devices shown in FIGS. 2 and 3.

FIG. 6 is a block diagram showing alternative circuitry to correct for skew in the primary signal. This embodiment uses an interpolation scheme which is the same as is used to correct for the skew of the secondary signal. The read address generator circuitry 24' is clocked by the signal CK but is otherwise the same as the circuitry 24 described in reference to FIG. 2. From the clock signal CK and the primary horizontal and vertical sync signals PHS and PVS, read address generator circuitry 24' develops the read address signal RADDR and the read control signals RCS which control the reading of the subsampled secondary luminance and color difference signals from the PIP field memory 68. The luminance samples, $Y_{ss}$, are applied to skew correcting circuitry 22' which is responsive to the fractional part of the signal PSK. Circuitry 22' may be identical to the skew correcting circuitry 62 described above in reference to FIG. 2. Circuitry 22' interpolates between successive ones of the samples $Y_{ss}$ to provide samples having values representing a signal delayed by the skew value. In other words, substantially the same signal as would be represented by the samples read from the memory in synchronism with a skew corrected clock signal. The luminance samples developed by the skew correcting circuitry 22' are applied to a DAC 72'. The (R−Y) and (B−Y) color difference samples provided by the field memory 68' are applied to the DAC 72' via the compensating delay elements 602 and 604 respectively. Delay elements 602 and 604 compensate for processing delay in the skew correcting circuitry 22'. As set forth in reference to the skew correcting circuitry 62, only the luminance signals need skew correction since the eye is less sensitive to changes in color than to changes in brightness. Nonetheless, it is contemplated that the delay elements 602 and 604 may be replaced by skew correcting circuitry similar to the circuitry 22' if skew correction of the color difference samples is found to be desirable. The DAC 72' is clocked by the uncorrected clock signal CK but is otherwise the same as the DAC 72 described with reference to FIG. 2. DAC 72' provides analog luminance and color difference signals representing the reduced secondary signal to the matrix 74.

Figure 3:
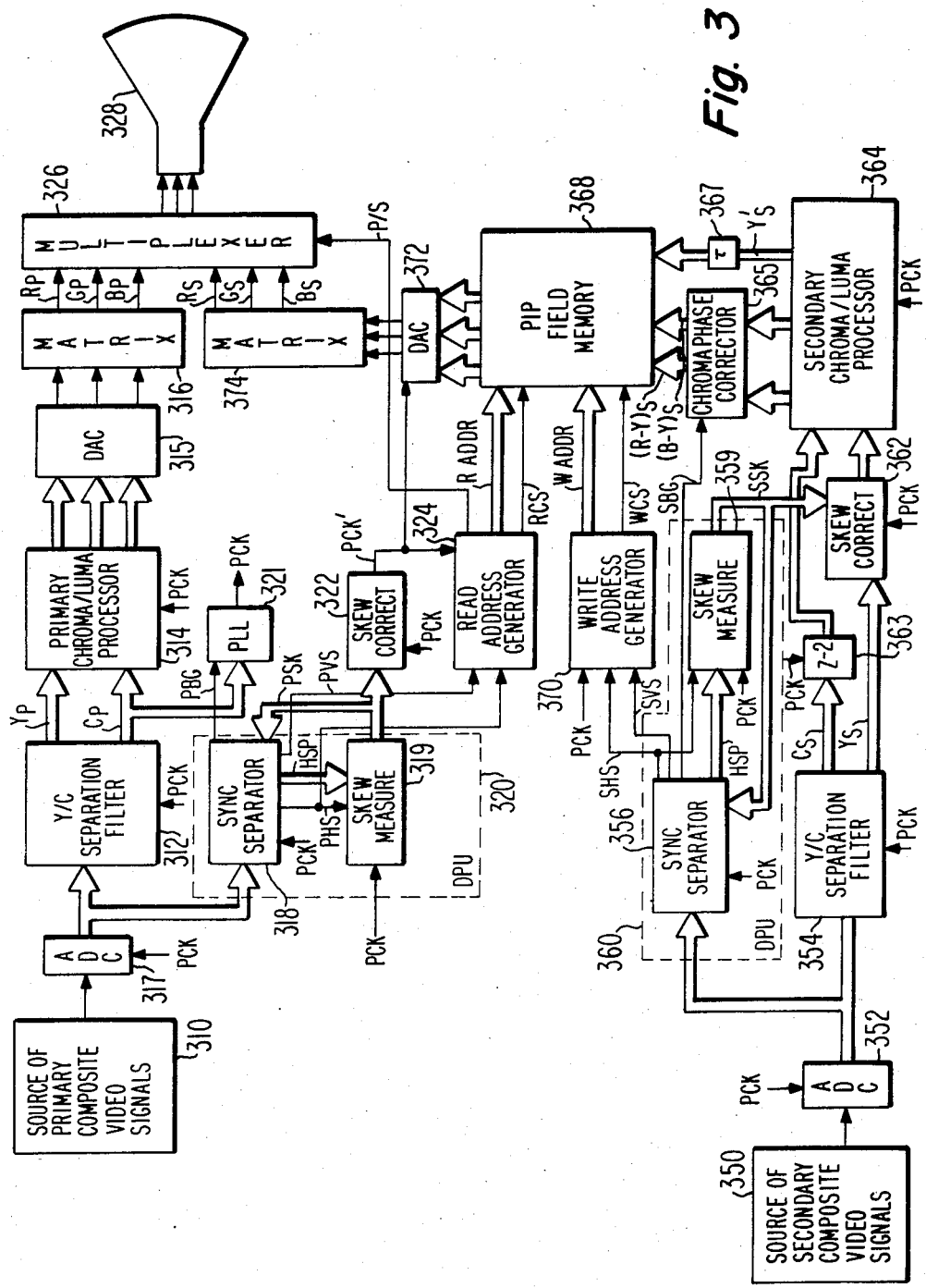
FIG. 3 is a block diagram of a digital PIP television display system incorporating the present invention.

FIG. 3 is a block diagram of an alternative embodiment of the invention in which both the primary and secondary signals are processed digitally. A single clock signal, PCK, which is phase locked to the primary color synchronizing burst signal, is used for both the primary and secondary processing circuitry. Since the secondary signals are sampled by a clock which is not phase locked to the secondary color burst signal, this embodiment of the invention includes circuitry to adjust the phase of the secondary chrominance signals to ensure proper color reproduction.

In the PIP system shown in FIG. 3, analog composite video signals from a source of primary composite video signals 310 are applied to an ADC 317. ADC 317 is responsive to the primary burst locked clock signal PCK to provide digital samples representing the analog primary video signals. These samples are applied to a Y/C separation filter 312 and to the DPU 320. DPU 320 is, for example, identical to the DPUs 20 and 60 described above. It provides the primary vertical and horizontal synchronization signals, PHS and PVS, a primary burst gate signal, PBG, and a signal, PSK, representing the skew of the clock signal, PCK, relative to the primary horizontal sync signal, PHS, as a proper fraction of the clock period. The Y/C separation filter 312, which may be identical to the filter 54, separates the luminance and chrominance components from the primary composite video signals.

The primary chrominance signals from filter 312 and the burst gate signal PBG from sync separator 318 are applied to the PLL 321. PLL 321, which may contain circuitry identical to that used by the PLL 56, generates the clock signal PCK having a frequency of substantially $4f_c$ that is phase-locked to the color burst component of the primary signal.

The primary luminance and chrominance signal components are applied to the primary chroma/luma processor 314. Chroma/luma processor 314 provides processed luminance signals and (R−Y) and (B−Y) color difference signals to the DAC 315. DAC 315 converts the digital luminance and color difference signals into analog form and applies the analog signals to an RGB matrix 316. Matrix 316 develops the red, green, and blue color signals which represent the primary image, and applies them to a first set of signal input terminals of a multiplexer 326. Multiplexer 326, selects between the color signals representing the primary image and color signals representing the secondary image, which are applied to a second set of signal input terminals, to drive the display device 328. Apparatus which generates the color signals for the secondary image and which generates the selection signal, P/S, for the multiplexer 326 is described below.

Analog composite video signals from a source of secondary composite video signals 350 are applied to an ADC 352. ADC 352 is responsive to the primary sampling clock signal PCK for providing samples representing secondary composite video signals to the Y/C separation filter 354 and to the DPU 360. DPU 360, for example, is identical to the DPUs 20 and 60 described above. It provides the secondary horizontal and vertical synchronization signals, SHS and SVS respectively, a secondary burst gate signal SBG, and a signal, SSK, representing the skew of the clock signal PCK relative to the secondary horizontal sync signal SHS as a proper fraction of the clock period.

Y/C separation filter 354, separates the secondary composite video samples into a luminance signal component and a chrominance signal component. The luminance signal component and the signal SSK from skew measuring circuitry 359 are applied to skew correcting circuitry 362. The circuitry 362 may be identical to the circuitry described with reference to FIG. 4. It produces luminance samples having equal skew from line-to-line relative to the secondary horizontal sync signal SHS. These samples are applied to the secondary chroma/luma processor 364. The chrominance samples from filter 354 are applied to the processor 364 via the delay element 363. Delay element 363 compensates for the processing delays incurred by the luminance samples in the skew correction circuitry 362 by delaying the chrominance samples by two sample periods.

The secondary luma/chroma processor 364 processes the luminance signal and demodulates the chrominance signal into two quadrature phase related color difference signals. In this instance, however, the color difference signals provided by the processor 364 may not be (R−Y) and (B−Y) signals. The demodulator in the chroma/luma processor 364 will provide (R−Y) and (B−Y) signals only when the sampling clock signal has a frequency of $4f_c$ and is phase locked to the color burst component of the secondary signal. In this embodiment, the sampling clock signal used to develop the secondary samples is phase locked to the primary color burst component. Since the primary and secondary signals may be from different sources, there may be phase and frequency differences between their respective color burst signals. Consequently, there may be phase errors in the demodulated color difference signals provided by the processor 364 relative to the (R−Y) and (B−Y) phases of the secondary signal. The present embodiment includes chrominance phase error correction circuitry 365 to detect and correct phase errors in the color difference signals provided by processor 364. This circuit is not a part of the present invention. Suitable circuitry 365 may be built by one skilled in the art from the teachings of the patent application Ser. No. 567,190 entitled "A Digital Video Signal Processing System Using Asynchronous A-to-D Encoding", which is hereby incorporated by reference. Briefly, the circuitry 365 converts the two color difference signals into a phase angle signal and an amplitude signal. The phase signal is compared against a reference phase during the secondary burst interval. The difference between the burst phase and the reference phase is used to correct the phase and amplitude signals in a closed loop control system. The corrected phase and amplitude signals are then processed to develop at least two color difference signals (e.g. (R−Y) and (B−Y)).

The phase corrected color difference signals provided by the circuitry 365 and the luminance signal provided by processor 364 via compensating delay element 367 are applied to the PIP field memory 368. The PIP field memory 368, memory write address generator circutry 370 and memory read address generator circuitry 324 may be similar to the respective field memory 68, and memory write and read address generator circutry 70 and 24 of FIG. 2. The circuitry 370 and 324 are responsive to the clock signal PCK and skew corrected clock signal PCK' respectively, but otherwise operate identically to the circuitry described above.

The skew corrected clock signal PCK' is developed by the skew correction circuitry 322. Circuitry 322, which may be similar to the circuitry 22, delays the clock signal PCK by the measured skew value times one-sixteenth of the period of PCK, to produce a skew corrected clock signal PCK'. It is contemplated that circuitry similar to that shown in FIG. 6 may be used in place of the skew correcting circuitry 622 to correct for the skew of the primary signal.

The samples provided by the PIP field memory 368 under control of the memory output address and timing control circuitry are applied to a DAC 372. DAC 372, synchronous with the skew corrected clock signal PCK', develops analog luminance and (R−Y) and (B−Y) color difference signals representing the secondary image and applies these samples to the matrix 374. Matrix 374 converts these luminance and color difference signals into red, green and blue color signals. These color signals, which represent the secondary image, are applied to the second set of signal input terminals of the analog multiplexer 326 as described above.

Although the embodiments described above use digital processing circuitry and use random access memory for the field store, it is contemplated that similar skew correction circuitry could be used with analog sampled data signals and that analog or digital shift register memories could be used for the field store.

What is claimed is:

1. In a video signal processing system including a source of first video signal having a periodic horizontal line synchronizing signal component and a memory for holding sampled data representing a second video signal, apparatus for processing said sampled data in synchronism with said first video signal comprising:

means coupled to said source for developing horizontal synchronizing pulses representing the horizontal line synchronizing signal component of said first video signal:

a terminal for applying a clock pulse signal wherein the occurrence of clock pulses possibly exhibits varying amounts of skew relative to said horizontal synchronizing pulses;

skew measuring means coupled to said clock signal terminal and responsive to said horizontal synchronizing pulses for generating a control signal corresponding to the difference in time, as a proper fraction of the period of said clock pulse signal, between the occurrence of a horizontal synchronizing pulse and a pulse of said clock signal;

means coupled to said clock signal terminal, for controlling the reading of the sampled data from said memory; and skew correcting means coupled to said clock signal terminal, to said memory and to said skew measuring means for effecting a time displacement of the signal represented by the sampled data read from said memory, the magnitude of said time displacement being determined by said control signal.

2. The apparatus set forth in claim 1 wherein said skew correcting means comprises:

means coupled to said clock signal terminal and responsive to said control signal for effecting a time displacement of said clock signal to develop a skew corrected clock signal; and means for applying said skew corrected clock signal to said means for controlling the reading of sampled data from said memory.

3. The apparatus set forth in claim 2 wherein:

said skew measuring means includes means for measuring the time interval between the center point of a pulse of said horizontal line synchronizing signal and a transition of the pulse of said clock signal which occurs in time immediately prior to said center point.

4. The apparatus set forth in claim 1 wherein said skew correcting means comprises:

means for generating samples corresponding to the sums of first and second consecutive samples read from said memory and scaled by respective first and second scale factors proportional to said control signal.

5. The apparatus set forth in claim 1 wherein said skew correcting means comprises:

means for scaling the values of first and second consecutive samples read from said memory by first and second mutually complementary scale factors proportional to said control signal; and means for combining the first and second scaled samples to develop samples representing said time displaced signal.

6. In a video signal processing system including a source of first video signal having a horizontal line synchronizing component and a source of second video signal having a horizontal line synchronizing component, apparatus for processing said second video signal in synchronism with said first video signal comprising:

means coupled to said source of first video signal for developing first horizontal synchronizing pulses representing the horizontal synchronizing component of said first video signal;

means coupled to said source of second video signal for developing second horizontal synchronizing pulses representing the horizontal line synchronizing component of said second video signal;

a terminal for applying a clock pulse signal, wherein the occurrence of clock pulses possibly exhibits respectively different varying amounts of skew relative to said first and second horizontal sync pulses;

means coupled to said source of second video signal for developing samples representing said second video signal at instants in time determined by said clock signal;

first skew measuring means coupled to said clock signal terminal and responsive to said second horizontal synchronizing pulses for generating a first control signal corresponding to the time difference between the occurrence of one of said second horizontal synchronizing pulses and a pulse of said clock pulse signal;

first skew correcting means responsive to said first control signal and coupled to said sampling means for modifiying the values of samples provided thereby to effect a time displacement of the signal represented by said samples, the magnitude of said time displacement being determined by said first control signal;

memory means coupled to said skew correcting means for storing samples representing said time displaced second signal;

second skew measuring means responsive to said clock signal and to said first horizontal synchronizing pulses for generating a second control signal corresponding to the time difference between the occurrence of one of said first horizontal synchronizing pulses and a pulse of said clock signal;

means coupled to said clock signal terminal for controlling the reading of the sampled data from said memory means; and second skew correcting means coupled to said clock signal terminal, to said memory and to said skew measuring means for effecting a time displacement of the signal represented by the sampled data read from said memory, the magnitude of said time displacement being determined by said second control signal.

7. The apparatus set forth in claim 6 wherein said second skew correcting means comprises:

means coupled to said clock signal terminal and responsive to said second control signal for effecting a time displacement of said clock signal to develop a skew corrected clock signal; and means for applying said skew corrected clock signal to said means for controlling the reading of sampled data from said memory.

8. The apparatus set forth in claim 6 wherein said second skew correcting means comprises:

means for generating samples corresponding to the sums of first and second consecutive samples read from said memory and scaled by respective first and second scale factors proportional to said second control signal.

9. The apparatus set forth in claim 6 wherein said second skew correcting means comprises:

means for scaling the values of first and second consecutive samples read from said memory by first and second mutually complementary scale factors proportional to said second control signal; and means for combining the first and second scaled samples to develop samples representing said time displaced signal.

10. The apparatus set forth in claim 6 wherein:

said first skew measuring means comprises means for measuring the time interval, as a proper fraction of a period of said clock signal, between a predetermined point on a pulse of said second horizontal line synchronizing signal and a transition of a pulse of said clock signal which is adjacent in time to said predetermined point; and said second skew measuring means comprises means for measuring the time interval, as a proper fraction of a period of said clock signal, between a predetermined point on a pulse of said first horizontal line synchronizing signal and a transition of a pulse of said clock signal which is adjacent in time to said predetermined point.

11. The apparatus set forth in claim 10 wherein said first skew correcting means includes means for scaling the values of first and second consecutive samples representing said second signal by a factor proportional to said first control signal and by a factor proportional to the complement of said first control signal respectively and means for adding the first and second scaled samples to develop a first sample representing said time displaced signal.

12. In a picture-in-picture television display system including a source of first video signal having a periodic horizontal line synchronizing signal component and a source of second video signal having a periodic horizontal line synchronzing signal component, apparatus for processing said second video signal in synchronism with said first video signal comprising:

means including a memory for processing said second video signal to develop sampled data in said memory representing said second video signal;

a terminal for applying a clock pulse signal wherein the occurrence of pulses of said clock signal possibly exhibits varying amounts of skew relative to the horizontal synchronizing pulses of said first video signal;

skew measuring means coupled to said clock signal terminal and responsive to said horizontal synchronizing pulses of said first signal for generating a control signal corresponding to the amount time, as a proper fraction of the period of said clock signal, between the occurrence of a horizontal synchronizing pulse and a pulse of said clock signal;

skew correcting means coupled to said clock signal terminal and responsive to said control signal for effecting a time displacement of said clock signal to develop a skew corrected clock signal:

means coupled to said skew correcting means and to said memory for extracting the sampled data therefrom in synchronism with said skew corrected clock signal; and multiplexing means coupled to said sampled data extracting means and to said source of first video signal for selectively providing signals from said source of first video signal and from said memory to a display device.

13. The apparatus set forth in claim 12 wherein:

said skew measuring means includes means for measuring the time interval between a predetermined point on a pulse of said horizontal line synchronizing signal and a transition of the pulse of said clock signal which occurs immediately prior to said predetermined point; and said skew correcting means includes means for delaying said clock signal by an amount of time approximately equal to said time interval to develop said skew corrected clock signal.

14. The apparatus set forth in claim 12 wherein said means for processing said second video signal comprises:

means coupled to said source of second video signal for developing further horizontal synchronizing pulses representing the horizontal line synchronizing signal component of said second video signal;

means coupled to said source of second video signal for developing samples representing said second video signal at instants in time determined by said clock signal;

further skew measuring means coupled to said clock signal terminal and responsive to said further horizontal synchronizing pulses for generating a further control signal corresponding to the amount of time, as a proper fraction of the period of said clock signal, between the occurrence of a further horizontal sync pulse and a pulse of said clock signal;

further skew correcting means coupled to said sample developing means and to said clock signal terminal and responsive to said further control signal for effecting a time displacement of the signal represented by the samples provided by said sample developing means;

means coupled to said further skew correcting means for applying selected ones of the samples provided thereby to said memory.

15. The apparatus set forth in claim 14 wherein,
said second video signal may include a color synchronizing burst signal component; and
the clock pulse signal applied to said clock terminal is synchronized in frequency and phase to said color synchronizing burst signal component.

16. The apparatus set forth in claim 14, wherein:
said first and second video signals include respective first and second chrominance signal components including respective first and second color synchronizing burst signal components;
the clock pulse signal applied to said clock terminal is synchronized in frequency and phase to said first color synchronizing burst signal component;
the chrominance signal components of the samples provided by said sample providing means tend to have phase errors relative to the samples which would be provided if the clock signal were locked in frequency and phase to the second color synchronizing burst signal component; and
means coupled to said sample providing means and responsive to said second color synchronizing burst signal component for substantially correcting said phase errors.

17. In a picture-in-picture television display apparatus including a source of first video signal having a periodic horizontal line synchronizing component, means for applying a clock pulse signal wherein the occurrence of clock pulses may exhibit varying amounts of skew relative to said horizontal line synchronizing component, a memory for holding sampled data representing a second video signal, means for displaying the image represented by said first video signal and means for reading the sampled data from said memory and for displaying the image represented by said samples as an inset in the image represented by said second video signal, wherein the improvement comprises:

skew measuring means responsive to said clock signal and to said horizontal synchronizing pulses for generating a control signal corresponding to the difference in time, as a proper fraction of the period of said clock signal between the occurrence of a horizontal synchronizing pulse and a pulse of said clock signal; and skew correcting means responsive to said clock signal and coupled to said memory and to said skew measuring means for effecting a time displacement of the sampled data read from said memory, the magnitude of said time displacement being determined by said control signal.

* * * * *